(12) United States Patent　　　(10) Patent No.: US 12,679,399 B2
　　Tsuda　　　　　　　　　　　　　(45) Date of Patent:　　　Jul. 14, 2026

(54) DRIVE ASSIST DEVICE

(71) Applicant: TOYOTA JIDOSHA KABUSHIKI KAISHA, Toyota (JP)

(72) Inventor: Yukikazu Tsuda, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/789,687

(22) Filed: Jul. 31, 2024

(65) Prior Publication Data

US 2025/0145169 A1　　May 8, 2025

(30) Foreign Application Priority Data

Nov. 2, 2023　　(JP) .................................. 2023-188427

(51) Int. Cl.
　　*B60W 30/18*　　　(2012.01)
　　*B60W 50/14*　　　(2020.01)
　　*G01C 21/34*　　　(2006.01)
　　*G08G 1/16*　　　(2006.01)

(52) U.S. Cl.
　　CPC ......... *B60W 50/14* (2013.01); *G01C 21/3492* (2013.01); *G08G 1/167* (2013.01); *B60W 2554/804* (2020.02)

(58) Field of Classification Search
　　CPC .......... B60L 53/64; B60L 53/62; B60L 53/63; B60L 53/50; G06Q 10/0631; G06Q 50/06; G06Q 50/40; Y02T 10/70; Y02T 10/7072
　　USPC ........................................................... 701/1
　　See application file for complete search history.

(56) References Cited

U.S. PATENT DOCUMENTS

| | | | |
|---|---|---|---|
| 9,964,950 B2 | 5/2018 | Takano | |
| 10,017,116 B2 | 7/2018 | Sato | |
| 10,310,508 B2 | 6/2019 | Kunisa et al. | |
| 10,452,930 B2 | 10/2019 | Sato | |
| 10,663,973 B2 | 5/2020 | Hashimoto et al. | |
| 10,895,875 B2 | 1/2021 | Hashimoto et al. | |
| 11,001,198 B2 | 5/2021 | Morimura et al. | |
| 11,275,382 B2 | 3/2022 | Hashimoto et al. | |
| 2007/0213924 A1 | 9/2007 | Nagase et al. | |
| 2018/0046196 A1 * | 2/2018 | Hashimoto | .......... B60W 50/14 |
| 2019/0276029 A1 * | 9/2019 | Umeda | .......... B60W 30/18163 |
| 2021/0229598 A1 | 7/2021 | Morimura et al. | |

(Continued)

FOREIGN PATENT DOCUMENTS

| | | |
|---|---|---|
| JP | 2007-240338 A | 9/2007 |
| JP | 2020-015480 A | 1/2020 |

*Primary Examiner* — Hossam M Abd El Latif

(74) *Attorney, Agent, or Firm* — SoraIP, Inc.

(57)　　　　　　　　ABSTRACT

A drive assist device includes: a surrounding situation recognition unit that recognizes a surrounding situation including a traveling state of another vehicle around the target vehicle; a traveling route acquisition unit that acquires a traveling route on which the target vehicle travels based on the traveling state of the target vehicle and the surrounding situation; and a lane change proposing unit. The lane change proposing unit proposes, to an occupant, a lane change to the lane for the low-speed vehicle as compared with the lane on which the target vehicle is traveling, when the lane mismatch condition indicating that the selection of the lane on which the target vehicle is traveling is a mismatch in light of the surrounding situation is satisfied, based on the relative speed of the other vehicle with respect to the target vehicle.

2 Claims, 6 Drawing Sheets

(56)              References Cited

U.S. PATENT DOCUMENTS

2021/0380124 A1    12/2021   Urano et al.
2024/0239333 A1*   7/2024   Kato ..................... B60W 30/09

* cited by examiner

DRIVE ASSIST DEVICE

CROSS-REFERENCE TO RELATED APPLICATION

This application claims priority to Japanese Patent Application No. 2023-188427 filed on Nov. 2, 2023, incorporated herein by reference in its entirety.

BACKGROUND

1. Technical Field

The present disclosure relates to a drive assist device.

2. Description of Related Art

Hitherto, there has been known a technology in which, when a preceding vehicle is traveling at a speed lower than a set vehicle speed in an overtaking lane, the preceding vehicle in the overtaking lane is prevented from being passed or overtaken in a traveling lane (for example, Japanese Unexamined Patent Application Publication No. 2020-15480 (JP 2020-15480 A)).

SUMMARY

For example, when a host vehicle is traveling in a center lane out of three lanes on one side at a speed equal to or lower than a speed limit, the flow of other vehicles around the host vehicle may be faster. When such a situation occurs with a lane for a low-speed vehicle as compared with a lane where the host vehicle is traveling, there is a possibility that the host vehicle hinders the traffic flow.

One aspect of the present disclosure relates to a drive assist device. The drive assist device includes:

- a surrounding situation recognition unit configured to recognize a surrounding situation including a traveling state of another vehicle around a host vehicle;
- a traveling route acquisition unit configured to acquire a traveling route where the host vehicle travels based on a traveling state of the host vehicle and the surrounding situation; and
- a lane change proposing unit configured to propose a lane change of the host vehicle to an occupant of the host vehicle based on the surrounding situation and the traveling route.

The lane change proposing unit is configured to propose, to the occupant, a lane change to a lane for a low-speed vehicle as compared with a lane where the host vehicle is traveling when a lane mismatch condition indicating that selection of the lane where the host vehicle is traveling is a mismatch in light of the surrounding situation is satisfied based on a relative speed of the other vehicle with respect to a speed of the host vehicle.

In the drive assist device according to the one aspect of the present disclosure, the lane change proposing unit proposes, to the occupant, the lane change to the lane for a low-speed vehicle as compared with the lane where the host vehicle is traveling when the lane mismatch condition indicating that the selection of the lane where the host vehicle is traveling is a mismatch in light of the surrounding situation is satisfied. For example, when the occupant accepts the proposal, the lane is changed to the lane for a low-speed vehicle, and the mismatch in the selection of the lane where the host vehicle is traveling is eliminated. As a result, it is possible to eliminate a situation in which the host vehicle may hinder the traffic flow, thereby facilitating the traffic flow.

In one embodiment, the lane mismatch condition may be satisfied when a case where the other vehicle traveling behind the host vehicle in the lane where the host vehicle is traveling changes the lane to the lane for a low-speed vehicle and overtakes the host vehicle or a case where the other vehicle traveling behind the host vehicle in the lane for a low-speed vehicle passes the host vehicle occurs successively for a predetermined number of the other vehicles. In this case, through the satisfaction of the lane mismatch condition in response to the overtaking or passing of the host vehicle by the predetermined number of the other vehicles, overtaking or passing by, for example, one other vehicle that is extremely faster than the host vehicle can be excluded from the factors in the proposal of the lane change.

In one embodiment, the lane change proposing unit may be configured not to propose the lane change to the lane for a low-speed vehicle to the occupant when the lane mismatch condition is satisfied and the surrounding situation corresponds to a predetermined proposal cancellation situation. In this case, when the surrounding situation corresponds to the predetermined proposal cancellation situation, there is a possibility that the host vehicle is less likely to hinder the traffic flow if the lane change is not performed. Therefore, it is possible to facilitate the traffic flow according to the surrounding situation.

With the drive assist device of the one aspect of the present disclosure, it is possible to eliminate the situation in which the host vehicle may hinder the traffic flow, thereby facilitating the traffic flow.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 1 is a block diagram illustrating a drive assist device according to an embodiment;

DETAILED DESCRIPTION OF EMBODIMENTS

Figures 2A, 2B:
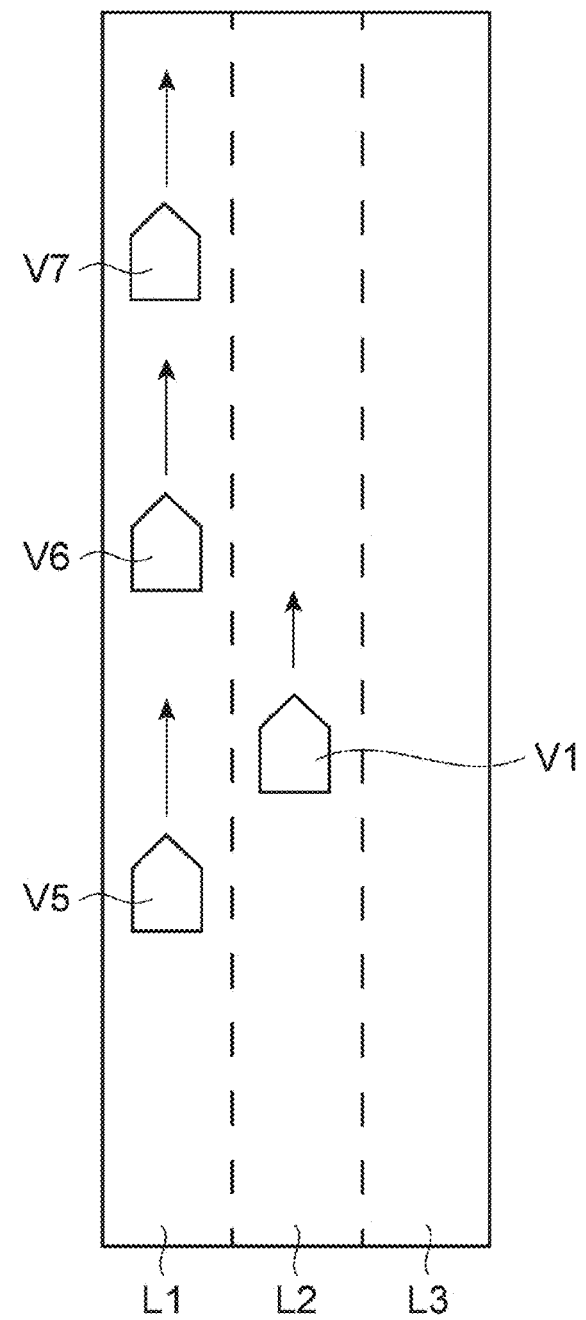
FIG. 2A is a schematic plan view for explaining a case where a lane mismatch condition is satisfied.
FIG. 2B is a schematic plan view for explaining a case where a lane mismatch condition is satisfied.

Hereinafter, embodiments of the present disclosure will be described with reference to the drawings. In the following description, the term "vehicle" may refer to the host vehicle, and the term "host vehicle" may refer to the host vehicle when distinguishing the host vehicle from other vehicles.

Figure 1:
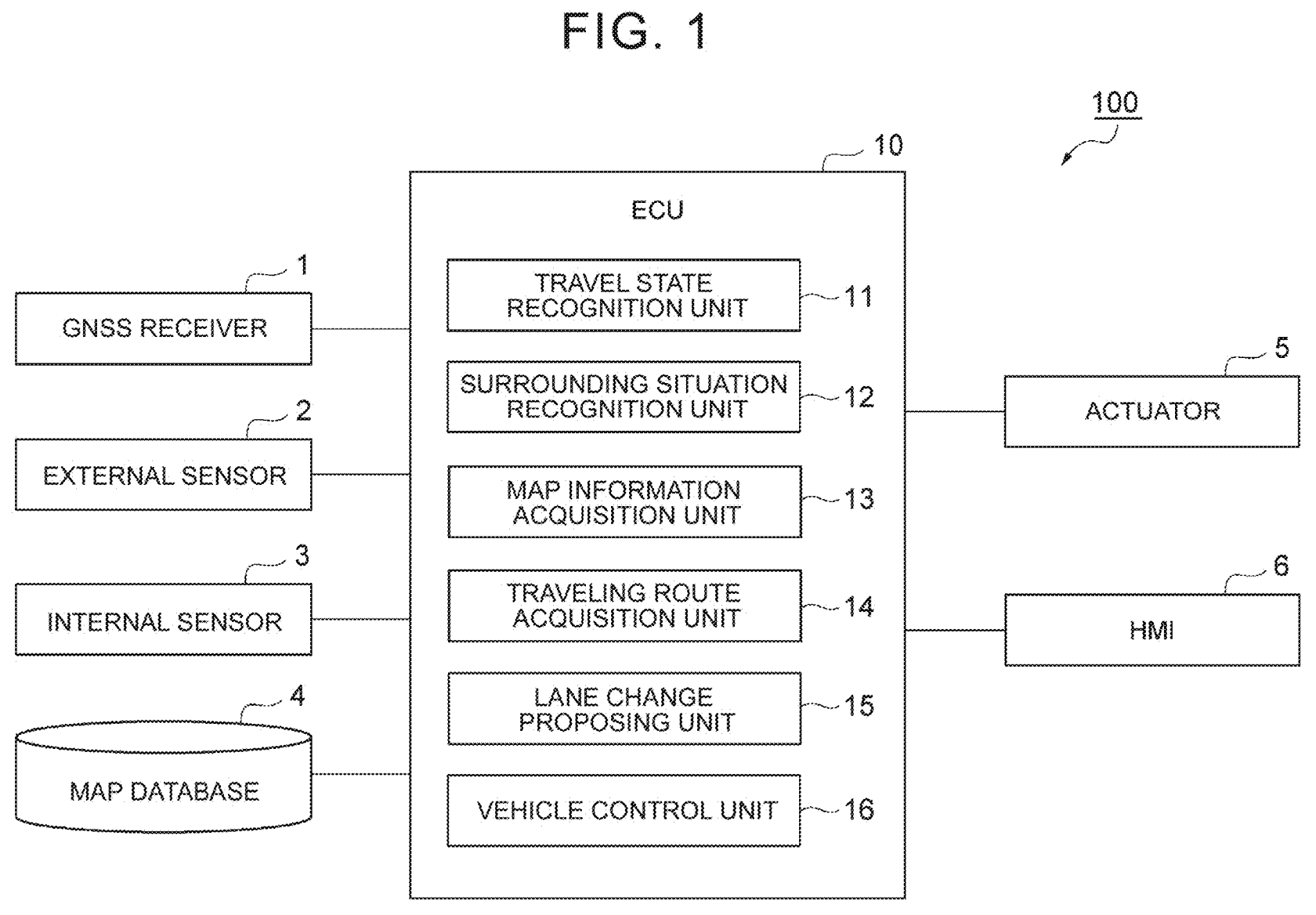

FIG. 1 is a block diagram illustrating a drive assist device according to an embodiment. As illustrated in FIG. 1, the drive assist device 100 is mounted on a vehicle (host vehicle) such as a passenger car or a freight car. The drive assist device 100 executes the driving assistance to the occupant of the vehicle including at least the notification of the proposal of the lane change to the occupant. The drive assist device 100 is, for example, a part of an automated driving apparatus that executes automated driving control. The autonomous driving control is a vehicle control for causing a vehicle to autonomously travel along a planned route without the driver performing a driving operation. Note that some of the functions of the drive assist device 100 may be executed on a server capable of communicating with the vehicle.

Configuration of Drive Assist Device

Hereinafter, the configuration of the drive assist device 100 according to the present embodiment will be described with reference to FIG. 1. As shown in FIG. 1, the drive assist device 100 includes an electronic control unit (ECU) 10 for comprehensively managing the device.

ECU 10 is an electronic control unit with a central processing unit (CPU) and a storage unit. The storage unit consists of, for example, read-only memory (ROM), random access memory (RAM), and electrically erasable programmable read-only memory (EEPROM). In ECU 10, for example, various functions are realized by executing a program stored in a storage unit by a CPU. ECU 10 may be composed of a plurality of electronic units.

ECU 10 is connected to GNSS receiver 1, the external sensor 2, the internal sensor 3, the map database 4, the actuator 5, and a human machine interface (HMI) 6.

GNSS receiver 1 measures the position of the vehicle (for example, the latitude and longitude of the vehicle) by receiving a signal from the positioning satellites. GNSS receiver 1 transmits the measured position data of the vehicles to ECU 10.

The external sensor 2 is a detection device that detects a situation around the vehicle. The external sensor 2 includes at least one of a camera and a radar sensor. The camera is an imaging device that captures an image of an external state of the vehicle. The camera is provided, for example, on the rear side of the windshield of the vehicle and captures an image of the front of the vehicle. ECU 10 is configured to transmit captured images related to an external condition of the vehicle. The radar sensor is a detection device that detects an object around the vehicle using radio waves (for example, millimeter waves) or light. The objects around the vehicle include other vehicles that travel behind the host vehicle. The radar sensor includes, for example, a millimeter-wave radar or a lidar (LiDAR: Light Detection and Ranging). The radar sensor transmits the detected object to ECU 10.

The internal sensor 3 is a detection device that detects a traveling state of the vehicle. The internal sensor 3 includes a vehicle speed sensor. The vehicle speed sensor is a detector that detects the speed of the vehicle. As the vehicle speed sensor, for example, a wheel speed sensor that detects a rotation speed of a drive shaft that rotates integrally with a wheel or a wheel of a vehicle is used. The internal sensor 3 may include an acceleration sensor and a yaw rate sensor.

The map database 4 is a database that stores map information. The map database 4 is formed in a storage device such as a hard disk drive (HDD) mounted on vehicles. The map information includes location information of a road, information of a road shape (for example, a curve, a type of a straight portion, a curvature of a curve, and the like), location information of an intersection and a branch point, and location information of a structure. The map information includes information on the number of lanes of the road. The map information may include at least one of position information in which the lane increases or decreases, information on the presence or absence of a hill-climbing lane, and information on the presence or absence of a slow lane in a road with one lane on one side. The map database 4 may be formed in a server capable of communicating with the vehicle.

The actuator 5 is a device used for controlling the vehicle. The actuator 5 includes at least a drive actuator, a brake actuator, and a steering actuator. The drive actuator controls the air-supply (throttle opening) to the engine in response to control signals from ECU 10 to control the driving force of the vehicle. When the vehicle is a hybrid electric vehicle (HEV: Hybrid Electric Vehicle), a control signal from ECU 10 is inputted to a motor serving as a power source in addition to the air-supply quantity to the engine, and the driving force is controlled. When the vehicle is a battery electric vehicle (BEV: Battery Electric Vehicle), a control signal from ECU 10 is inputted to a motor serving as a power source, and the driving force is controlled. The motor as a power source in these cases constitutes the actuator 5.

The brake actuator controls the brake system in response to control signals from ECU 10 and controls the braking force imparted to the wheels of the vehicle. As the brake system, for example, a hydraulic brake system can be used. The steering actuator controls driving of an assist motor that controls the steering torque in the electric power steering system in response to a control signal from ECU 10. Thus, the steering actuator controls the steering torque of the vehicle.

HMI 6 is an interface for inputting and outputting data between ECU 10 and the occupant. HMI 6 includes, for example, a display, a speaker, a microphone, and the like provided in the vehicle cabin. HMI 6 outputs images of the display and sounds from the speakers in response to control signals from ECU 10. The display may also function as a touch panel. The display may be a centralized display, a navigational display, or a head up display (HUD). HUD presents images to the passenger by projecting the images onto the windshield of the vehicle.

HMI 6 presents the passenger with information regarding the suggestion for lane change. The information regarding the suggestion of the lane change may be presented to the occupant by an image output or may be presented to the occupant by an audio output. HMI 6 accepts an approval operation for a lane change proposal by the occupant who has received the proposal. The approval operation may be an operation of pressing a switch provided in a steering wheel or the like, a touch operation of an approval button image displayed on a touch panel, or a voice input indicating approval by an occupant via a microphone.

Next, the functional configuration of ECU 10 will be described. ECU 10 includes a traveling state recognition unit 11, a surrounding situation recognition unit 12, a map information acquisition unit 13, a traveling route acquisition unit 14, a lane change proposing unit 15, and a vehicle control unit 16.

The traveling state recognition unit 11 may recognize the position of the vehicles on the map based on the position information of GNSS receiver 1 and the map information of the map database 4. The traveling state recognition unit 11 may recognize the position of the vehicles by simultaneous localization and mapping (SLAM) technique using the position information of the fixed obstacle such as the utility pole included in the map information of the map database 4 and the detection result of the external sensor 2. In addition, the traveling state recognition unit 11 may recognize the position of the vehicle on the map by a well-known method.

The traveling state recognition unit 11 recognizes the traveling state of the vehicle based on the detection result of the internal sensor 3. The traveling state includes the vehicle speed of the vehicle. The driving state may include an acceleration of the vehicle and a yaw rate of the vehicle. The traveling state recognition unit 11 recognizes the vehicle speed of the vehicle based on the vehicle speed information of the vehicle speed sensor. The traveling state recognition unit 11 may recognize the acceleration of the vehicle based on the vehicle speed information of the acceleration sensor. The traveling state recognition unit 11 may recognize the direction of the vehicle based on the yaw rate information of the yaw rate sensor.

The surrounding situation recognition unit 12 recognizes the surrounding situation of the vehicle based on the detection result of the external sensor 2. The surrounding situation includes a traveling state of another vehicle in the vicinity of the vehicle. The surrounding conditions include the relative position, relative speed, and direction of movement of objects such as surrounding other vehicles relative to the vehicle. The surrounding situation may include information on the type of an object such as another vehicle, a pedestrian, or a bicycle. The surrounding situation may include information of a division line recognized by known white line recognition or the like. The surroundings may include signs and road shapes in front of the vehicle. The surrounding situation may include a state of congestion of another vehicle traveling around the vehicle.

The traveling route acquisition unit 14 acquires a traveling route on which the vehicle travels based on the traveling state of the vehicle and the surrounding state. The traveling route acquisition unit 14 may acquire the travel route on which the vehicle travels by using the position information of the vehicle measured by GNSS receiver 1 and the map information of the map database 4.

The traveling route here corresponds to which lane the vehicle is traveling on the road on which the vehicle is traveling. As the traveling route, it may be acquired which lane the vehicle is traveling on from the number of lanes of the division line and the map information recognized as the surrounding situation. The traveling route may be acquired from information on a target route along a target route used in vehicle control such as autonomous driving control. The target route is a route on which the vehicle travels by autonomous driving control. The target route is set by automatic driving control, for example, based on the destination set by the occupant, the position information of the vehicle, and the map information.

The traveling route is acquired, for example, in correspondence with the number of lanes of the road at a position where the vehicle is currently traveling in the extending direction of the road. It should be noted that traveling route may be acquired in accordance with the number of lanes of the road at a position which is located ahead of the vehicle by a predetermined distance in the traveling direction of the vehicle in the extending direction of the road, for example, when the section of the slow lane in a road with one lane on one side is an object of the suggestion of the lane change.

The lane change proposing unit 15 proposes a lane change of the host vehicle to an occupant of the host vehicle on the basis of the surrounding situation and the traveling route.

More specifically, the lane change proposing unit 15 proposes, to the occupant, a lane change to a lane for a low-speed vehicle as compared with a lane on which the host vehicle is traveling, when the lane mismatch condition is satisfied based on the relative velocity of the other vehicle with respect to the host vehicle. The lane mismatch condition is a condition indicating that the selection of the lane on which the host vehicle is traveling is a mismatch in light of the surrounding situation. The lane change proposing unit 15 controls HMI 6 so as to present the passenger with information about the lane change proposal.

The selection of the lane on which the host vehicle is traveling means the determination of the driver or the vehicle control that the host vehicle has reached the lane where the host vehicle is located among the plurality of lanes on the road on which the host vehicle is currently traveling or will be traveling in the near future. The selection of the lane on which the host vehicle is traveling corresponds to the fact that the host vehicle has traveled in accordance with the steering operation of the driver who is the occupant in the manual driving. The selection of the lane on which the host vehicle is traveling may correspond to the selection of the target route along the target route of the automatic driving control in the automatic driving.

The lane mismatch condition is a condition indicating that the selection of the lane on which the host vehicle is traveling is a mismatch in light of the surrounding situation. A mismatch in light of the surrounding conditions means, for example, host vehicle is traveling at a limited speed in a lane other than the lane in which the vehicle is scheduled to travel at the lowest speed among a plurality of lanes. It means a situation that the traffic flow is such that other vehicles around the host vehicle are traveling at a faster vehicle speed than the host vehicle.

Lane mismatch condition is established when the first condition or the second condition is consecutive for a predetermined number of other vehicles. The first condition is that the other vehicle traveling in the lane in which the host vehicle is traveling behind host vehicle changes the lane to the lane for the low-speed vehicle and overtakes the host vehicle. The second condition is that the other vehicle that has been traveling in the lane for the low-speed vehicle behind the host vehicle overtakes the host vehicle.

FIGS. 2A and 2B are schematic plan views for explaining a case where a lane mismatch condition is satisfied. In FIGS. 2A and 2B, the traveling lane (lane) L1 that is scheduled to travel at the lowest speed, the traveling lane (lane) L2 that is the second traveling lane, and the overtaking lane (lane) L3 are arranged in this order from the left in the traveling direction on the road of the three lanes on one side.

In the embodiment illustrated in FIG. 2A, the other vehicle V2 that was traveling behind the host vehicle V1 in the traveling lane L2 in which the host vehicle V1 is traveling, changes lanes to the traveling lane L1 for low-speed vehicles and overtakes the host vehicle V1. The other vehicle V3, V4 also overtakes the host vehicle V1 as in the other vehicle V2. As described above, when the other vehicle V2 traveling in the traveling lane L2 in which the host vehicle V1 travels behind the host vehicle V1 changes the lane to the traveling lane L1 for the low-speed vehicle and overtakes the host vehicle V1 continues for a predetermined number (three in this case) of other vehicles V2 to V4, the lane mismatch condition may be satisfied. The lane change proposing unit 15 proposes to the occupant a lane change to the traveling lane L1 for the low-speed vehicle as compared with the traveling lane L2 in which the host vehicle V1 is traveling in FIG. 2A.

In the example in FIG. 2B, the other vehicle V5 that was traveling behind the host vehicle V1 in the traveling lane L1 for low-speed vehicles, overtakes the host vehicle V1. The other vehicle V6, V7 also overtakes the host vehicle V1 in the same way as the other vehicle V5. As described above, the lane mismatch condition may be established when a predetermined number (three in this case) of other vehicle V2 to V4 are consecutive in which the other vehicle V5 traveling in the traveling lane L1 for the low-speed vehicle at the rear side of the host vehicle V1 surpasses the host vehicle V1. The lane change proposing unit 15 proposes to the occupant a lane change to the traveling lane L1 for the low-speed vehicle as compared with the traveling lane L2 on which the host vehicle V1 is traveling in FIG. 2B.

When the lane mismatch condition is satisfied and the surrounding situation corresponds to the predetermined proposal cancellation situation, the lane change proposing unit 15 does not have to propose the lane change to the lane for the low-speed vehicle to the occupant. The proposal cancellation state means a state in which, even when the lane mismatch condition is satisfied, there is a possibility that the host vehicle may disturb the traffic flow when the host vehicle changes the lane.

Figures 3A, 3B:
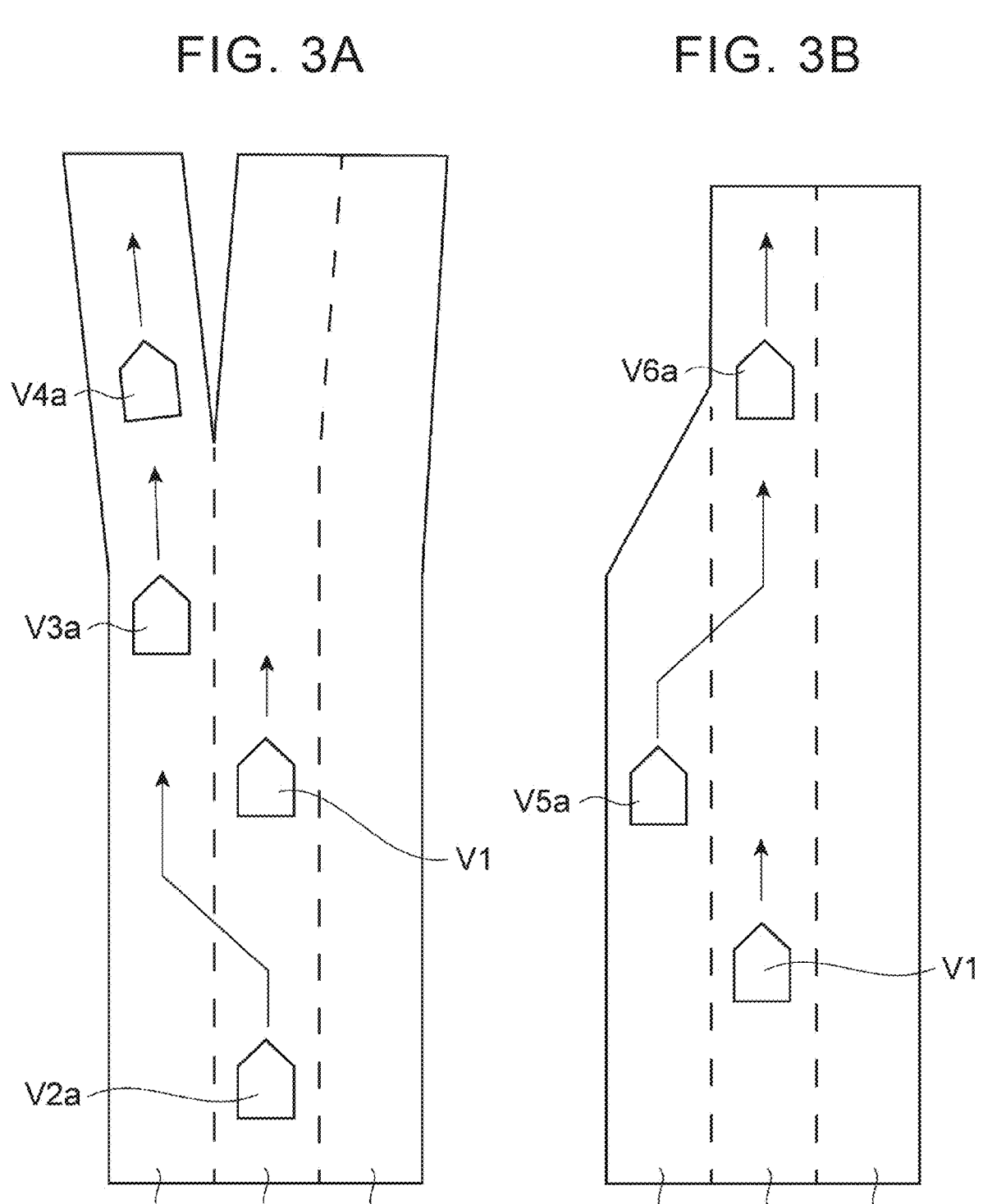
FIG. 3A is a schematic plan view for explaining a case where the surrounding situation corresponds to the proposal cancellation situation.
FIG. 3B is a schematic plan view for explaining a case where the surrounding situation corresponds to the proposal cancellation situation.

FIGS. 3A and 3B are schematic plan views for explaining a case where the surrounding situation corresponds to the proposal cancellation situation. In the example in FIG. 3A, the other vehicle V2a traveling in the traveling lane L5 in which the host vehicle V1 is traveling behind the host vehicle V1 changes the lane to the traveling lane L4 for the low-speed vehicle and overtakes the host vehicle V1 continuously for a predetermined number (three in this case) of the other vehicle V2a to V4a, and the lane mismatch condition is satisfied. However, the traveling lane L4 branches from the traveling lane L5 in front of the host vehicle V1. Here, when the direction toward the traveling lane L5 and the overtaking lane L6 is the target route of the host vehicle V1, if the host vehicle V1 changes the lane to the traveling lane L4, the lane is changed again so as to return to the traveling lane L5 immediately, and there is a possibility that the host vehicle V1 hinders the traffic flow. Therefore, the lane change proposing unit 15 does not propose the lane change to the traveling lane L4 for the low-speed vehicle to the occupant when the traveling lane L4 branches from the traveling lane L5 in front of the host vehicle V1 as compared with the traveling lane L5 in which the host vehicle V1 is traveling.

In the example in FIG. 3B, the other vehicle V5a traveling in the traveling lane L1a for the low-speed vehicle passes through the host vehicle V1 after a predetermined number (two in this case) of other vehicle V5a, V6a have been consecutively performed, and the lane mismatch condition is satisfied. However, the traveling lane L1a merges with the traveling lane L2a in front of the host vehicle V1. Here, if the host vehicle V1 changes the lane to the traveling lane L1a, the host vehicle V1 may disturb the traffic flow by changing the lane again so as to immediately return to the traveling lane L2a. Therefore, the lane change proposing unit 15 does not propose to the occupant a lane change to the traveling lane L1a for the low-speed vehicle as compared with the traveling lane L2a in which the host vehicle V1 is traveling when the traveling lane L1a merges with the traveling lane L2a in front of the host vehicle V1.

Figures 4A, 4B:
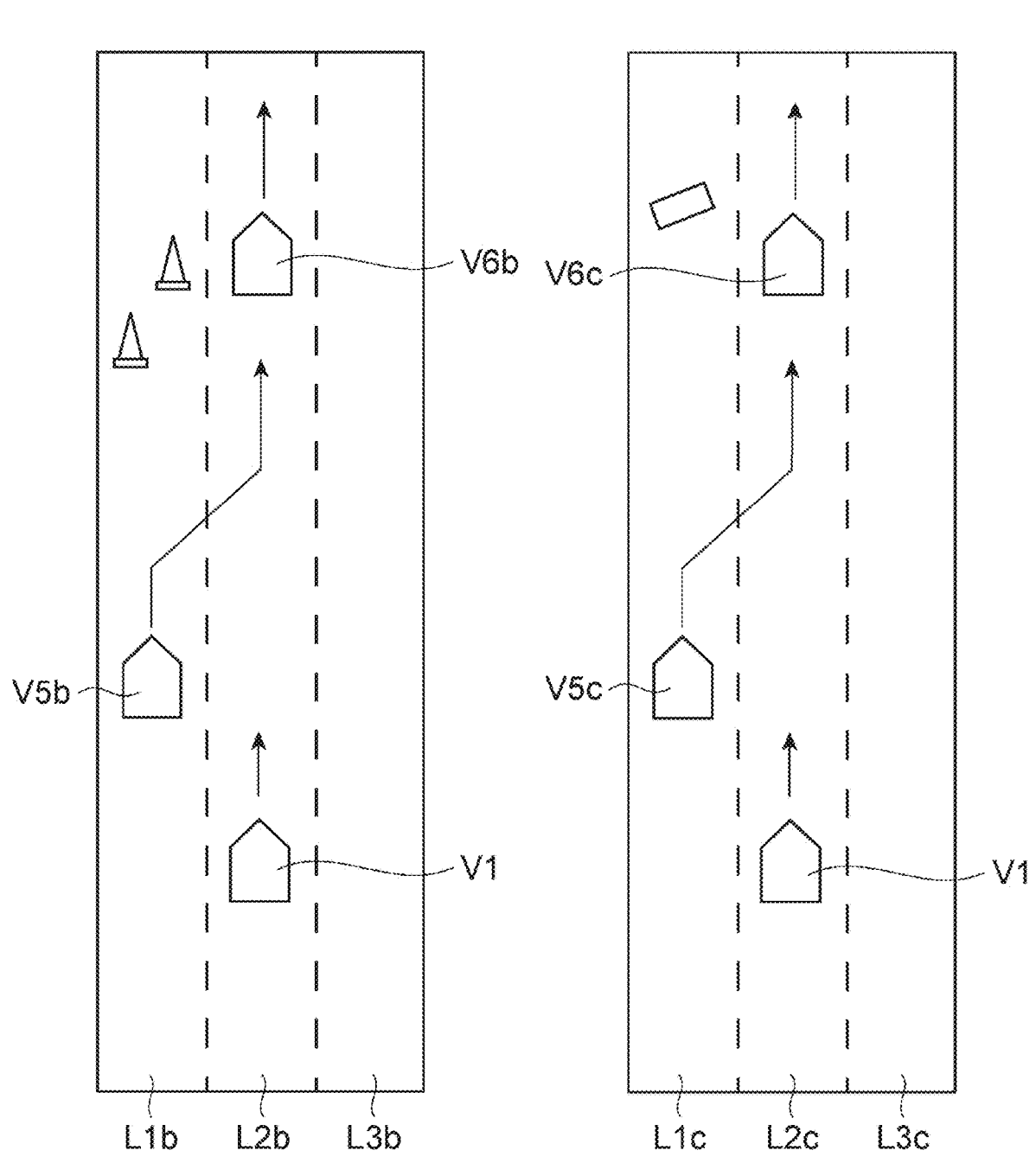
FIG. 4A is a schematic plan view for explaining a case where the surrounding situation corresponds to the proposal cancellation situation.
FIG. 4B is a schematic plan view for explaining a case where the surrounding situation corresponds to the proposal cancellation situation.

FIGS. 4A and 4B are schematic plan views for explaining a case where the surrounding situation corresponds to the proposal cancellation situation. In the example shown in FIG. 4A, the other vehicle V5b that was traveling in the traveling lane L1b for the low-speed vehicle has passed through the host vehicle V1 after a predetermined number (two in this case) of the other vehicle V5b, V6b have been consecutively performed, and the lane mismatch condition is satisfied. However, a lane is restricted by road construction or the like in a traveling lane L1b in front of the host vehicle V1. Here, if the host vehicle V1 changes the lane to the traveling lane L1b, the host vehicle V1 may disturb the traffic flow by changing the lane again so as to immediately return to the traveling lane L2b. Therefore, the lane change proposing unit 15 does not propose the lane change to the traveling lane L1b for the low-speed vehicle to the occupant as compared with the traveling lane L2b in which the host vehicle V1 is traveling, when the lane restriction by road construction or the like is performed in the traveling lane L1b in front of the host vehicle V1.

In the example shown in FIG. 4B, the other vehicle V5c traveling in the traveling lane L1c for the low-speed vehicle passes through the host vehicle V1 after a predetermined number (two in this case) of the other vehicle V5c, V6c have been consecutively performed, and the lane mismatch condition is satisfied. However, there is a falling object in the traveling lane L1c in front of the host vehicle V1. Here, if the host vehicle V1 changes the lane to the traveling lane L1c, the host vehicle V1 may disturb the traffic flow by changing the lane again so as to immediately return to the traveling lane L2c. Therefore, the lane change proposing unit 15 does not propose the lane change to the traveling lane L1c for the low-speed vehicle to the occupant when the falling object is present in the traveling lane L1c in front of the host vehicle V1 as compared with the traveling lane L2c in which the host vehicle V1 is traveling.

Figure 5A:
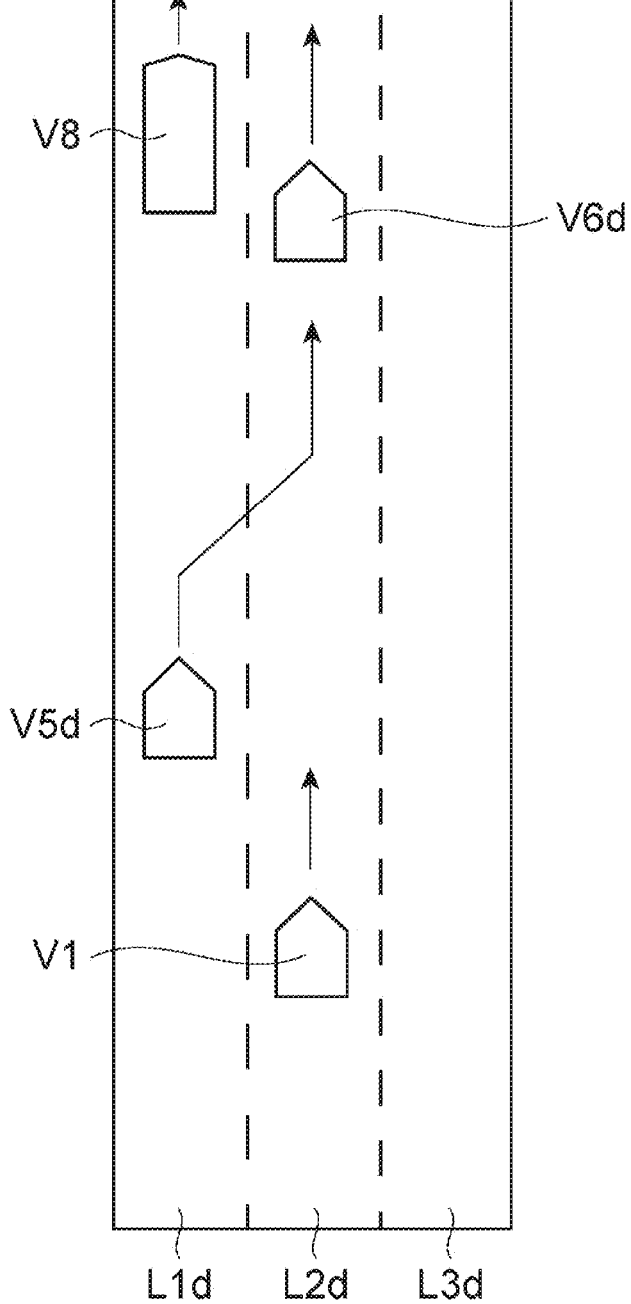
FIG. 5A is a schematic plan view for explaining a situation where the peripheral situation corresponds to the proposal discontinuation situation.

FIG. 5A is a schematic plan view for explaining a situation in which the peripheral situation corresponds to the proposal discontinuation situation. In FIG. 5A, the road is a steep uphill slope, and the other vehicle V5d that was traveling in the hill-climbing lane L1d for the low-speed vehicle has passed the host vehicle V1 for a predetermined number (two in this case) of other vehicle V5d, V6d, and the lane mismatch condition is satisfied. However, the trailer V8 loaded with heavy objects in the hill-climbing lane L1d in front of the host vehicle V1 climbs at an extremely low speed. Here, if the host vehicle V1 changes the lane to the hill-climbing lane L1d, the host vehicle V1 may disturb the traffic flow by changing the lane again so as to immediately return to the traveling lane L2d. Therefore, the lane change proposing unit 15 does not propose, to the occupant, a lane change to the hill-climbing lane L1d for the low-speed vehicle as compared with the traveling lane L2d in which the host vehicle V1 is traveling when the trailer V8 on which the heavy object is loaded in the hill-climbing lane L1d in front of the host vehicle V1 is climbing at an extremely low speed.

Figure 5B:
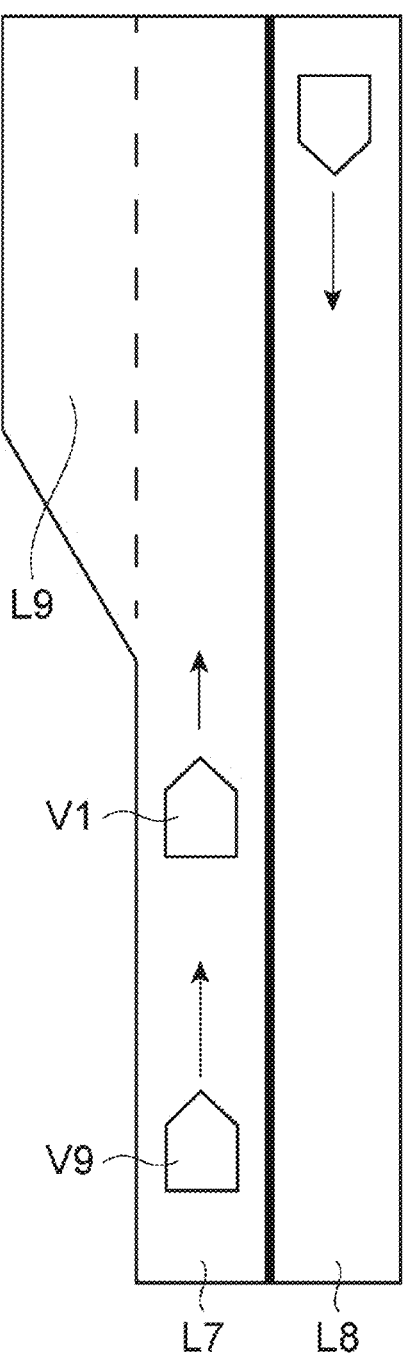
FIG. 5B is a schematic plan view for explaining when a lane mismatch condition is satisfied.

Incidentally, the FIG. 5B is a schematic plan view for explaining the cases where the lane mismatch condition is satisfied. In the illustrated FIG. 5B, the host vehicle V1 basically travels on a road with one lane on one side where the host vehicle lane L7 and the oncoming lane L8 face each other. A slow lane L9 for a low-speed vehicle is provided on the host vehicle lane L7 in front of the host vehicle V1. The other vehicle V9 that was traveling in the host vehicle lane L7 behind the host vehicle V1, catches up with the host vehicle V1. Under such circumstances, the host vehicle V1 is one lane on one side at the present position of the vehicle, but the host vehicle V1 may hinder the traffic flow, so there is room for facilitating the traffic flow. Therefore, the drive assist device 100 proposes the lane change to the slow lane L9 for the low-speed vehicle to the occupant, with the section of the slow lane L9 on the road with one lane on one side as the object of the proposal of the lane change. The traveling route acquisition unit 14 may acquire the traveling route in accordance with the number of lanes of the road at a position where the slow lane L9 is located at a predetermined distance ahead of the present position of the host vehicle V1 in the extending direction of the road. The lane mismatch condition may be satisfied, for example, when the relative velocity when the other vehicle V9 that has traveled in the host vehicle lane L7 catches up with the host vehicle V1 is equal to or greater than a predetermined value and there are a predetermined number of subsequent vehicles in the other vehicle V9. When the lane mismatch condition is satisfied, the lane change proposing unit 15 proposes to the occupant a lane change to the slow lane L9 for the low-speed vehicle as compared with the host vehicle lane L7 on which the host vehicle V1 is traveling.

The vehicle control unit 16 may execute the automatic lane change control according to the presence or absence of an approval operation by the occupant for the proposal by the lane change proposing unit 15. The vehicle control unit 16 may perform automatic lane change control of the host vehicle by transmitting a control signal to the actuator 5.

Operation of the Drive Assist Device

Figure 6:
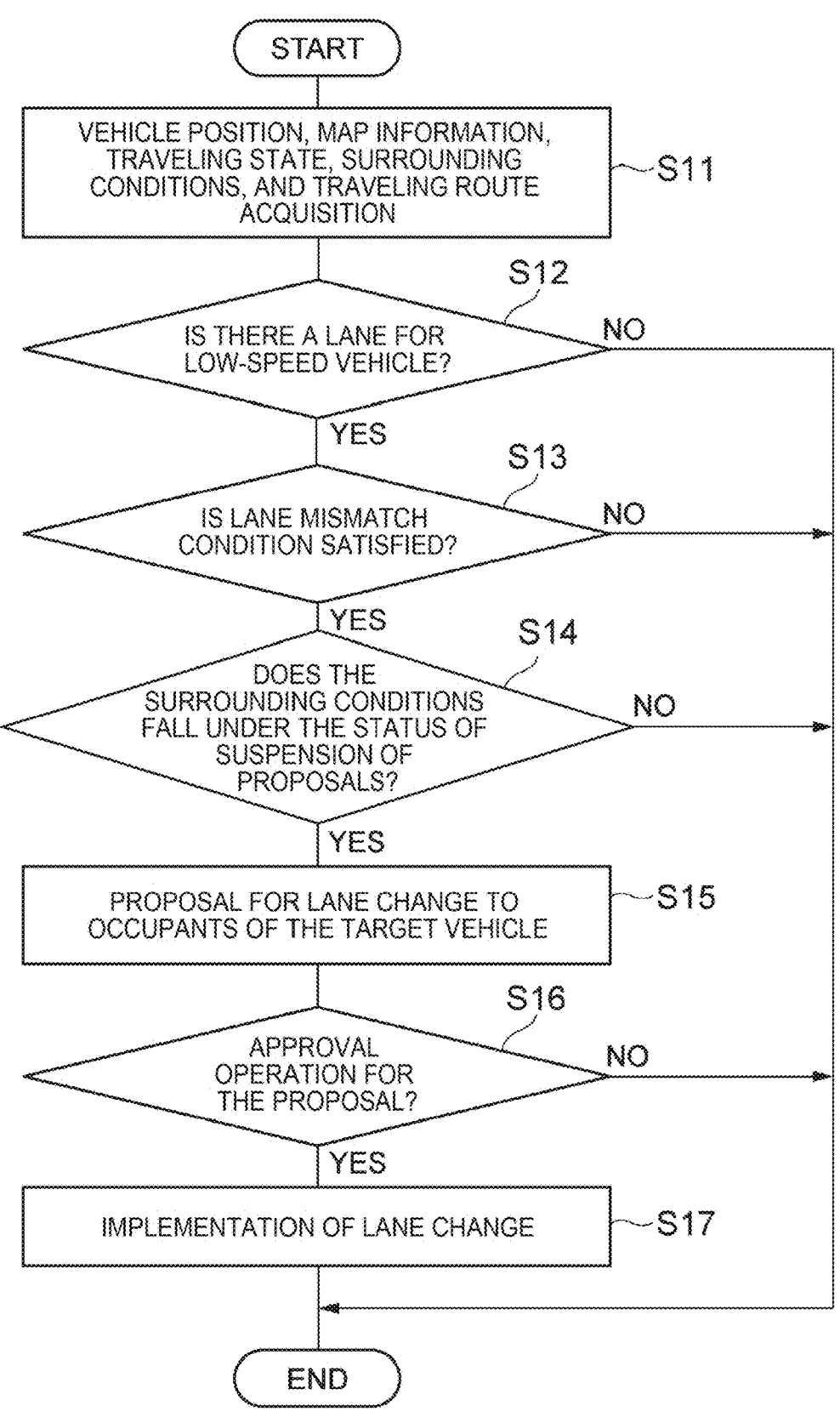
FIG. 6 is a flow chart illustrating an exemplary process of ECU of FIG. 1.

Next, the operation of the drive assist device 100 will be described with reference to the drawings. FIG. 6 is a flow chart illustrating an exemplary process of ECU of FIG. 1. ECU process is executed, for example, during the autonomous driving control of the vehicles.

As shown in FIG. 6, as S11, ECU 10 of the drive assist device 100 performs of acquiring the vehicle position, the map information, the traveling state, the surrounding state, and the traveling route by the traveling state recognition unit 11, the surrounding situation recognition unit 12, the map information acquisition unit 13, and the traveling route acquisition unit 14.

In S12, ECU 10 determines whether or not there is a lane for the low-speed vehicle by the lane change proposing unit 15. As shown in FIG. 5B, ECU 10 may determine whether or not there is a lane for the low-speed vehicle at a predetermined distance forward along the traveling direction from the present position of the host vehicle in the road extending direction.

When the lane change proposing unit 15 determines that there is a lane for a low-speed vehicle (S12: YES), ECU 10 proceeds to S13. When the lane change proposing unit 15 determines that there is no lane for the low-speed vehicle (S12: NO), ECU 10 ends the process of FIG. 6. After that, ECU 10 repeats the process from S11 after a certain period of time.

In S13, ECU 10 determines whether or not the lane mismatch condition is satisfied by the lane change proposing unit 15. When the lane change proposing unit 15 determines that the lane mismatch condition is satisfied (S13: YES), ECU 10 proceeds to S14. When the lane change proposing unit 15 determines that the lane mismatch is not satisfied (S13: NO), ECU 10 ends the process of FIG. 6. After that, ECU 10 repeats the process from S11 after a certain period of time.

In S14, ECU 10 determines, by the lane change proposing unit 15, whether or not the surrounding state does not correspond to the proposal cancellation state. When the lane change proposing unit 15 determines that the surrounding state does not correspond to the proposal cancellation state (S14: YES), ECU 10 proceeds to S15. When the lane change proposing unit 15 determines that the surrounding state corresponds to the proposal cancellation state (S14: NO), ECU 10 ends the process of FIG. 6. After that, ECU 10 repeats the process from S11 after a certain period of time.

As S15, ECU 10 proposes a lane change to the occupant of the host vehicle by the lane change proposing unit 15. The lane change proposing unit 15 proposes a lane change to an occupant of the host vehicle using, for example, an HMI 6.

In S16, ECU 10 determines, by the lane change proposing unit 15, whether or not the proposal has been approved. When the lane change proposing unit 15 determines that the occupant has approved the lane change proposal for the occupant of the host vehicle (S16: YES), ECU 10 proceeds to S17. When the lane change proposing unit 15 determines that the lane change proposal to the occupant has not been approved (S16: NO), ECU 10 ends the process of FIG. 6. After that, ECU 10 repeats the process from S11 after a certain period of time.

ECU 10 performs lane change by the vehicle control unit 16 as S17. The vehicle control unit 16 performs automatic lane change control of the host vehicle by, for example, transmitting a control signal to the actuator 5. After that, ECU 10 repeats the process from S11 after a certain period of time.

According to the drive assist device 100 described above, when the lane mismatch condition indicating that the selection of the lane on which the host vehicle is traveling is a mismatch in light of the surrounding condition is satisfied, a lane change to the lane for the low-speed vehicle is proposed to the occupant by the lane change proposing unit 15 as compared with the lane on which the host vehicle is traveling. For example, when the occupant accepts the proposal, the lane is changed to the lane for the low-speed vehicle, and the mismatch in the selection of the lane on which the host vehicle is traveling is eliminated. As a result, it is possible to eliminate a situation in which the host vehicle may hinder the traffic flow, and to facilitate the traffic flow.

In drive assist device 100, the lane mismatch condition is established when the other vehicle traveling in the lane in which the host vehicle is traveling at the rear of the host vehicle changes the lane to the lane for the low-speed vehicle and overtakes the host vehicle, or the other vehicle traveling in the lane for the low-speed vehicle at the rear of the host vehicle overtakes the host vehicle, and the predetermined number of the other vehicles is consecutive. As a result, the lane mismatch condition is established when the host vehicle is overtaken or passed by another vehicle by a certain amount or more, it is possible to make the lane change proposal to be excluded even if the host vehicle is overtaken or passed by one other vehicle that is extremely faster than the host vehicle, for example.

In the drive assist device 100, the lane change proposing unit 15 does not propose the lane change to the lane for the low-speed vehicle to the occupant when the lane mismatch condition is satisfied and the surrounding situation recognition unit 12 corresponds to the predetermined proposal stop situation. Accordingly, when the surrounding situation corresponds to the predetermined proposal cancellation situation, there is a possibility that the host vehicle is less likely to hinder the traffic flow if the lane change is not performed. Therefore, it is possible to facilitate the traffic flow according to the surrounding situation.

Although the embodiments of the present disclosure have been described above, the present disclosure is not limited to the above-described embodiments. The present disclosure may be embodied in various forms with various changes and modifications, including the above-described embodiments, based on the knowledge of those skilled in the art.

In the above-described embodiment, the drive assist device 100 is a part of the automated driving apparatus that executes the automated driving control, but the automated driving control is not essential. The drive assist device 100 may be capable of performing automatic lane change control, but automatic lane change control is not essential. Even during manual driving, the drive assist device 100 may propose, to the occupant, at least when the lane mismatch condition is satisfied, a lane change to the lane for the low-speed vehicle as compared with the lane on which the host vehicle is traveling.

In the above embodiment, as shown in FIGS. 2A to 5B, the lane mismatch condition and the proposal cancellation condition are exemplified, but the lane mismatch condition and the proposal cancellation condition are not limited thereto.

What is claimed is:

1. A drive assist device comprising:

a processor; and a memory storing executable instructions that cause the processor to:

acquire host vehicle speed information indicating a host-vehicle speed detected by a host vehicle speed sensor provided on the host vehicle;

acquire a host-vehicle traveling state information indicating a traveling state of a host vehicle from an internal sensor provided on the host vehicle, the host-vehicle traveling state information including the host vehicle speed information;

acquire surrounding situation information from an external sensor mounted on the host vehicle, the surrounding situation information including other-vehicle traveling state information indicating the traveling state of another vehicle around the host vehicle, the other-vehicle traveling state information including a relative speed of the other vehicle with respect to the host vehicle speed;

acquire a traveling route on which the host vehicle travels based on the host-vehicle traveling state information and the surrounding situation information;

determine whether a lane mismatch condition is satisfied based a comparison of the relative speed of the other vehicle and the host vehicle speed, the lane mismatch condition indicating there is a mismatch between a selected travel lane in which the host vehicle is traveling in light of the surrounding situation information;

output a visual or an audio notification to an occupant of the host vehicle to suggest changing the selected travel lane of the host vehicle to a slower traffic lane for traffic traveling slower than in the selected travel lane; and control the host vehicle to change to the slow traffic lane in response to the occupant approving the visual or audio notification suggesting the changing from the selected travel lane to the slower traffic lane, wherein the lane mismatch condition is satisfied in a case where the other vehicle is initially traveling behind the host vehicle in the selected travel lane of the host vehicle and changes to the slower traffic travel lane before passing the host vehicle; or a predetermined number of other vehicles initially traveling behind the host vehicle in the slower traffic travel lane pass the host vehicle.

2. The drive assist device according to claim 1, wherein the executable instructions further cause the processor to not output the visual or the audio notification to suggest changing to the slower traffic lane when the lane mismatch condition is satisfied and the surrounding situation corresponds to a predetermined lane-change notification cancellation situation.

* * * * *